Feb. 25, 1958 G. M. THOMAS 2,824,769
LOAD BRAKE MECHANISM
Filed April 6, 1954
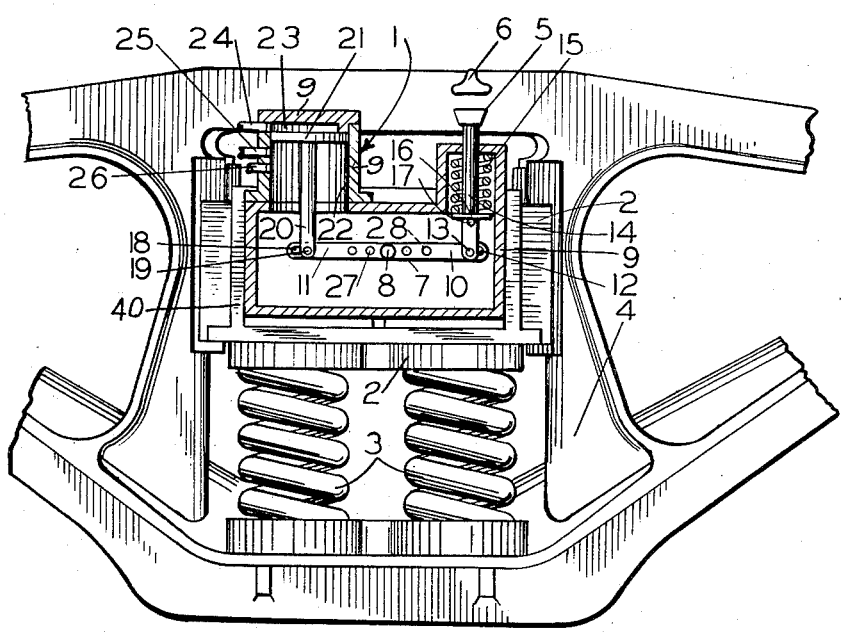
INVENTOR.
Glenn M. Thomas
BY
[signature]
ATTORNEY

United States Patent Office 2,824,769
Patented Feb. 25, 1958

2,824,769

LOAD BRAKE MECHANISM

Glenn M. Thomas, Irwin, Pa., assignor to Westinghouse Air Brake Company, Wilmerding, Pa., a corporation of Pennsylvania Application April 6, 1954, Serial No. 421,247

3 Claims. (Cl. 303—22)

This invention relates to load compensating fluid pressure brake equipment for railway vehicles and more particularly to load weighing apparatus for such equipment.

The type of load compensating fluid pressure brake equipment to which this invention relates may best be represented by that shown and described in copending patent application Serial No. 357,984, filed May 28, 1953 by Glenn T. McClure and assigned to the assignee of the present invention. In this type of brake equipment, the deflection of the springs supporting the vehicle body is used as the gauge for conditioning the brake equipment to provide the proper braking power for the weight of the load on the vehicle body. As is well known, the degree of deflection of truck springs under a given load varies in different types of cars and therefore the vertical position of the vehicle body relative to the trunk frame under a particular load will be different for different cars. Also, the body supporting springs take a permanent set after a period of use which will necessitate a readjustment of the weighing gear to obtain the same range of travel for the load adjustable part of the brake equipment between empty and fully loaded as had initially existed.

An object of this invention, therefore, is to provide a novel means for adjusting the regulating mechanism of a load compensating brake equipment so as to obtain the proper relation between the degree of spring deflection under load and the displacement of the adjustable part of the regulating mechanism so that the braking power obtained will be in keeping with the variations in load on the vehicle.

Other objects and advantages will become apparent from the following detailed description of the invention taken in connection with the accompanying drawing, wherein the single figure is an elevational view, partly in section, of a portion of a car truck carrying a load adjustable and load weighing mechanism which embodies the invention.

*Description*

As shown in the drawing, the reference numeral 1 designates a load measuring mechanism embodying the invention as shown carried by a truck bolster 2 through the medium of an adapter member 40 to which such mechanism is secured and which in turn is secured to such bolster by suitable means (not shown), which bolster is supported by springs 3 on a truck frame 4 in the usual manner. Since the measuring mechanism 1 is mounted in the truck bolster 2 which supports a portion of a car body (not shown), the measuring mechanism will be moved downwardly relative to the truck frame 4 as the load on the car body increases, which load may be measured by determining the change in distance between a measuring element 5 of said measuring mechanism and a vertically stationary stop 6 formed on said truck frame.

The load measuring mechanism 1 comprises an operating lever 7 rockably mounted on a fulcrum pin 8, anchored in a portion of a divided casing means 9 of the mechanism and dividing said lever into an arm 10 at the right-hand side and an arm 11 at the left-hand side of said pin, as viewed in the drawing. The right-hand end of the arm 10 is provided with a slot 12 in which a pin 13 is rockably and slidably carried for operably connecting said arm to a stem 14 of the measuring element 5, which stem is slidably mounted in a suitable opening in casing 9 for vertical movement therein. The stem 14 is encircled by a spring 15 interposed between a wall of the casing and a spring seat 16, positioned on the stem by means of a pin 17, and urging said stem downwardly toward the position, in which it is shown in the drawing.

The left-hand end of the arm 11 is provided with a slot 18 in which a pin 19 is rockably and slidably carried for operably connecting said arm to a piston rod 20 attached to a piston 21 slidably mounted in a bore 22 formed in the casing 9. At the upper side of piston 21, as viewed in the drawing, there is defined in bore 22 a chamber 23 which is constantly open to a supply conduit 24 through which fluid under pressure may be supplied to said chamber for actuating said piston.

*Operation*

In operation, fluid under pressure will be supplied from a suitable source (not shown) through conduit 24 to chamber 23, in response to which piston 21 will move downwardly, acting through the medium of piston rod 20 and pin 19 to rock the lever 7 in a counterclockwise direction about the fulcrum pin 8. Through the medium of pin 13 and stem 14, counterclockwise movement of the lever 7 will cause the measuring element 5 to move upwardly until said element contacts the stop 6. Since the stop 6 is affixed to the truck frame 4, which is stationary vertically, while the measuring element 5 forms a part of the load measuring mechanism 1 carried by the truck bolster 2, which is a spring-borne part of the vehicle, it follows that the distance that the measuring element 5 will travel before contacting the stop 6 will be correspondingly greater when the degree of deflection of truck springs 3 under the load on the vehicle happens to be greater. Consequently, the opening for a control conduit 25 is so located longitudinally in the wall of the bore 22 that, if the vehicle be half-loaded, the distance traveled by the measuring element 5 before contacting the stop 6 will be sufficient to permit the piston 21 to move downwardly past the opening for conduit 25 and thereby connect supply conduit 24 to control conduit 25 by way of chamber 23. Fluid under pressure thus supplied to control conduit 25 may condition a load compensating fluid pressure brake apparatus, such as that disclosed in the aforementioned copending application, for braking a partially loaded, or half-loaded, vehicle as described therein.

As previously mentioned, the load supporting springs for different cars vary with respect to deflection between empty and fully loaded conditions of the cars. For example, the distance between the bolster 2 and the stop 6 may be of such magnitude on an empty car as to permit the piston 21 to travel sufficiently during a load adjusting operation of the brake apparatus to connect chamber 23 to conduit 25, or even to conduit 26. The brake apparatus would then be conditioned to brake either a partially loaded car or a fully loaded car, as the case may be, when actually the car was empty. Such overbraking would tend to produce severe shock conditions which would damage the car or possibly the train. In fact, it would produce a condition which the load compensating brake apparatus described in the aforementioned copending application is provided to specifically prevent. In order that the piston 21 will assume a proper position according to load on the different cars, means are provided for varying the ratio between the arms 10 and 11 of the lever 7 to increase or decrease the travel of said piston in relation to the measuring element 5 so that the piston travel will bear the proper relation to travel of said measuring element. To this end, a plurality of openings 27 are provided at regular intervals along the length of the lever 7 for the accommodation of the fulcrum pin 8, which pin may be anchored in corresponding, tapped holes, indicated by broken lines 28, in the casing.

It will be apparent from the foregoing that, if a car having brake apparatus embodying this invention is empty and the piston 21 thereof reaches a position in which chamber 23 is connected to conduit 25, which would condition the apparatus for braking a partially loaded vehicle, the fulcrum pin 8 should be relocated at an opening 27 in lever arm 11 nearer its outer end, which as shown would be to the left, so as to provide a shorter range of movement of piston 21 relative to that of element 5. This range of movement should be such that measuring element 5 contacts stop 6 before chamber 23 is opened to conduit 25. Conversely, if piston 21 fails to connect chamber 23 to conduit 26 during the load adjustment period on a loaded car, the fulcrum pin 8 should be relocated outwardly from the position shown on the lever arm 10 to increase the relative movement of piston 21 to such a degree that chamber 23 will be connected to conduit 26 before element 5 contacts the stop. Such a situation might occur when the truck springs 6 have been replaced by different ones.

While this invention has been described in connection with a three-stage load compensating brake, it will be understood that the same advantages may be obtained from the use of this invention in cooperation with a two-stage brake in which there will be required only one outlet port in the strut device to condition the brake apparatus for braking either an empty or loaded car as the case may be. Here, also, the invention may be utilized to properly relate the movement of the measuring element to that of the strut device piston.

Having now described my invention, what I claim as new and desire to secure by Letters Patent, is:

1. In a load brake mechanism for a railway vehicle having a truck frame, a truck bolster, truck springs supporting the truck bolster and carried by the truck frame, and a stop element disposed above the truck bolster and affixed to the truck frame, the combination of casing means adapted to be mounted in a fixed position on the truck bolster, a measuring stem mounted in said casing means for vertical movement into and out of contact at its upper end with said stop element to sense the degree of the deflection of the truck springs, a piston mounted in said casing means for reciprocable movement along a vertical axis in laterally spaced-apart relationship with respect to said measuring stem and subject on its upper face to pressure of fluid in an expansible chamber defined by said casing means in cooperation with said piston, a piston rod operably connected at its upper end to said piston and extending downwardly therefrom for vertical movement therewith, a lever extending between the lower ends of said piston rod and said measuring stem and pivotally connected thereto, a fulcrum pin removably secured to said casing means and rockably supporting said lever intermediate its ends, and spring means constantly urging said measuring stem downwardly and said piston upwardly toward respective repose positions, said casing means being provided with a plurality of fulcrum pin attachment-accommodating stations enabling location of said fulcrum pin at any one of a plurality of points at spaced-apart intervals in the direction of extension of said lever when disposed according to the repose positions of said piston and measuring element, and said lever being provided with a corresponding number of fulcrum pin supportable stations to enable said fulcrum pin to be repositioned in said casing means relative to opposite ends of said lever.

2. The combination as set forth in claim 1, characterized in that said spring means is constituted by a single spring member acting to urge said measuring stem downwardly and, through the medium of said lever and said piston rod, to urge said piston upwardly, and further characterized in that the repose positions of both said measuring stem and said piston are defined by engagement of said piston with said casing means.

3. The combination as set forth in claim 1, further characterized in that said casing means is provided with fluid pressure port means located in the path of travel of said piston to become connected to said expansible chamber for brake control purposes according to travel of said piston as permitted by movement of said measuring stem into engagement with the stop element attached to the truck frame.

References Cited in the file of this patent

UNITED STATES PATENTS

| | | |
|---|---|---|
| 430,024 | Hooper | June 10, 1890 |
| 1,720,284 | Maliphant | July 9, 1929 |
| 2,155,225 | Hewitt | Apr. 18, 1939 |
| 2,364,927 | Sudduth | Dec. 12, 1944 |
| 2,367,598 | Miller | Jan. 16, 1945 |
| 2,402,434 | Nelson et al. | June 16, 1946 |
| 2,450,464 | Bent | Oct. 5, 1948 |